US011849746B1

(12) United States Patent
Woodward

(10) Patent No.: US 11,849,746 B1
(45) Date of Patent: Dec. 26, 2023

(54) FERMENTATION SYSTEMS AND METHODS IN KOMBUCHA MANUFACTURE

(71) Applicant: Brendan McKnight Woodward, Everett, WA (US)

(72) Inventor: Brendan McKnight Woodward, Everett, WA (US)

(*) Notice: Subject to any disclaimer, the term of this patent is extended or adjusted under 35 U.S.C. 154(b) by 735 days.

(21) Appl. No.: 16/422,899

(22) Filed: May 24, 2019

(51) Int. Cl.
*C12H 3/04* (2019.01)
*A47J 31/06* (2006.01)
*A23L 33/14* (2016.01)
*A23L 2/38* (2021.01)
*A23F 3/16* (2006.01)
*C12C 11/00* (2006.01)
*C12C 13/10* (2006.01)
*B01D 29/03* (2006.01)
*A23L 2/52* (2006.01)

(52) U.S. Cl.
CPC ............. *A23L 33/14* (2016.08); *A23F 3/166* (2013.01); *A23L 2/382* (2013.01); *A47J 31/0626* (2013.01); *B01D 29/036* (2013.01); *C12C 11/006* (2013.01); *C12C 13/10* (2013.01); *C12H 3/04* (2019.02); *A23L 2/52* (2013.01); *A23V 2002/00* (2013.01)

(58) Field of Classification Search
CPC ... A47J 31/0615; A47J 31/0626; B01D 29/03; B01D 29/036; B01D 35/027; C12H 3/04
USPC ....... 99/277.1, 304, 322, 323; 210/474, 406, 210/416.1, 445
See application file for complete search history.

(56) References Cited

U.S. PATENT DOCUMENTS

| | | | | |
|---|---|---|---|---|
| 3,269,545 A * | 8/1966 | Udell | ..................... | A47J 36/08 210/474 |
| 4,842,869 A * | 6/1989 | Forino | ..................... | C12L 9/00 426/11 |
| 5,035,800 A * | 7/1991 | Kopach | ................ | B01D 29/085 210/474 |
| 5,326,473 A * | 7/1994 | Lascombes | ......... | A61M 1/1656 604/416 |
| 5,518,612 A * | 5/1996 | Kayal | .................... | B01D 35/00 422/537 |
| 8,580,560 B1 * | 11/2013 | Ellis | ...................... | B01L 3/5635 210/488 |

* cited by examiner

*Primary Examiner* — Reginald Alexander
(74) *Attorney, Agent, or Firm* — PELOQUIN, PLLC; Mark S. Peloquin, Esq.

(57) ABSTRACT

An apparatus used to ferment a liquid during kombucha manufacture includes a bonnet. The bonnet is configured to cover an opening of a container. The container defines a volume to hold the liquid. The container has a lip that defines the opening. The bonnet further includes a filter. The filter is permeable to a gas and has a pore size. The bonnet includes an elastic member. The elastic member is coupled to the filter. The elastic member is elastically engageable with the lip such that when the bonnet is attached to the container the bonnet covers the opening and the elastic member is removably sealable to the lip. When the bonnet is engaged with the lip, a gas can pass through the filter and particles larger than the pore size are kept out of the liquid by the filter during fermentation of the liquid, thereby preventing contamination of the liquid.

16 Claims, 16 Drawing Sheets

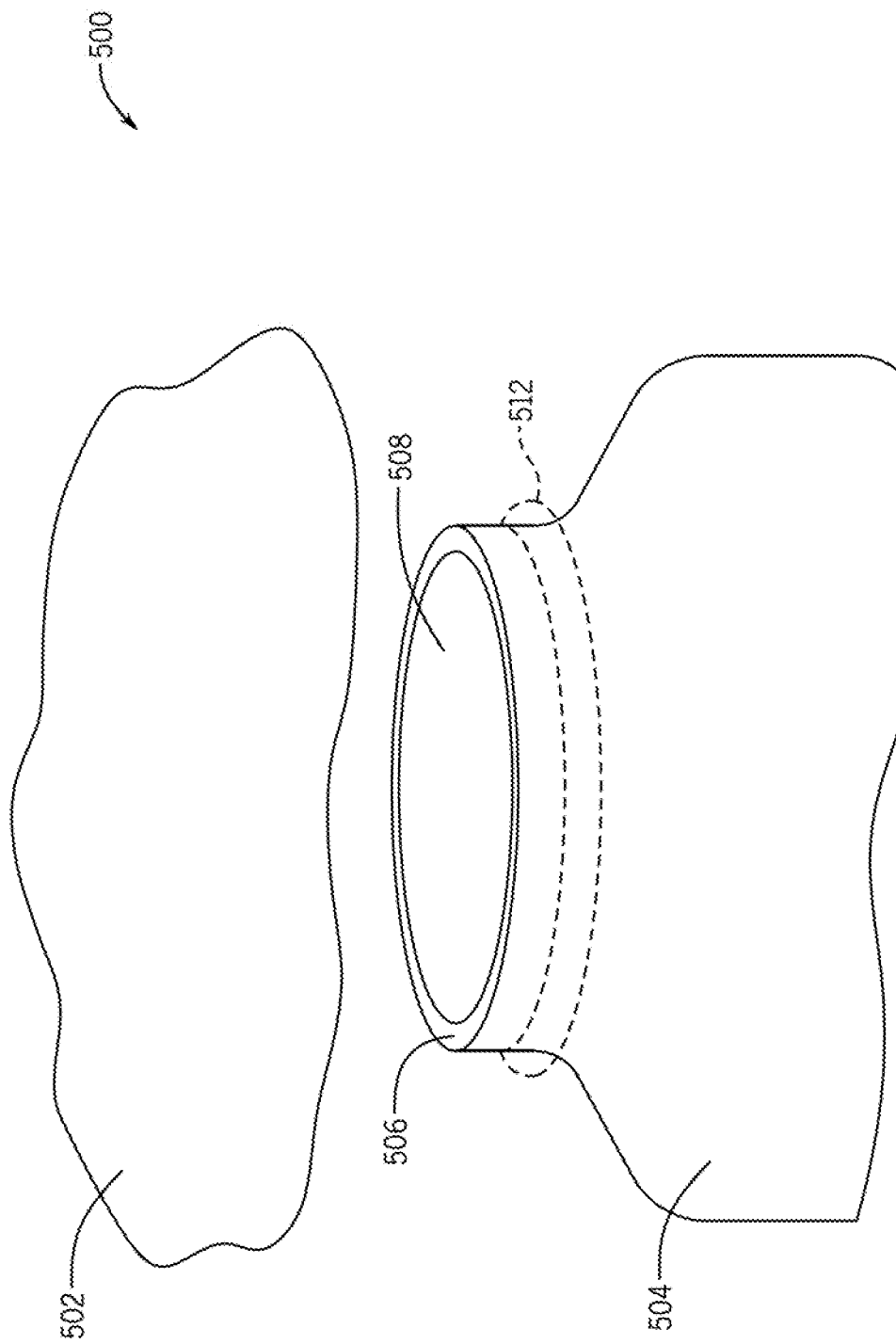

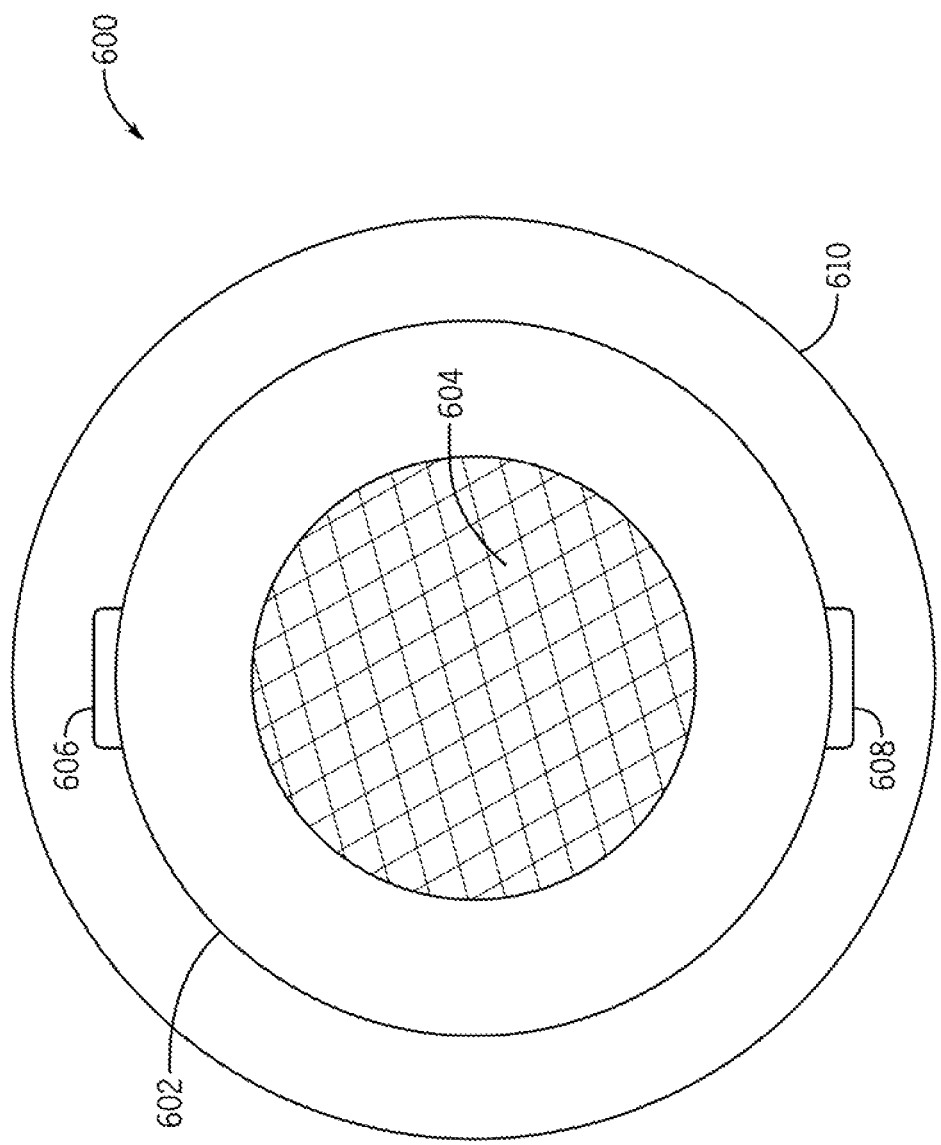

FERMENTATION SYSTEMS AND METHODS IN KOMBUCHA MANUFACTURE

BACKGROUND OF THE INVENTION

1. Field of Invention

The invention relates generally to kombucha manufacturing and more specifically to filtering systems for kombucha brewing.

2. Art Background

Kombucha is a fermented tea made for human consumption. Kombucha manufacturing begins with brewing the tea. The tea is then fermented with sugar and a bacteria colony known in the art as a SCOBY (symbiotic colony of bacteria and yeast) in a container made from glass, stainless steel, ceramic, plastic or other food safe material. The fermentation phase can last for approximately seven (7) to thirty (30) days, the length of which depends on personal taste and the desired amount of sugar that one wishes to remain in the final drink. Fermentation proceeds in the tea both aerobically and anaerobically. Aerobic fermentation requires a supply of air. The current method of supplying air to the liquid in the fermentation container is to cover the opening of the container with a porous cloth. Current thinking among kombucha brewers is that an open weave cloth such as cheesecloth or cotton muslin is required to permit adequate air flow during fermentation.

The fermenting tea attracts contamination from the environment. Insects, such as fruit flies, fruit fly eggs, mold spores, dust, and other small airborne particulate debris can come to rest on top of the cloth, fall through, and contaminate the fermenting tea. This can present a problem because contaminated tea can become spoiled and is then discarded causing waste and loss of resources.

The materials considered essential to kombucha manufacturing, e.g., cotton muslin and cheesecloth, have "pore sizes" (or equivalently "mesh sizes") that are large compared with the sizes of potential contaminants. For example, cotton muslin has a mesh size of 2.5 millimeter to 5 millimeter depending on the thread-count of a given weave. Cheesecloth comes in grades spanning the range from grade 10 to grade 90. Grade 90 provides the smallest mesh using 44×36 threads/inch during manufacture. Thus, grade 90 has an effective pore size of 0.56 millimeter×0.68 millimeter. The size of a fruit fly ranges from 3 to 4 millimeters while fruit fly eggs are approximately 0.5 millimeter long. Thus, cotton muslin provides an ineffective barrier against contamination by fruit fly eggs and only the smallest mesh size cotton muslin is marginally effective against direct contamination by fruit flies ingress. This can present a problem. Similarly, cheesecloth provides an ineffective barrier against contamination by fruit fly eggs since the fruit fly egg has a smaller size (0.5 millimeter) than the smallest mesh opening in grade 90 cheesecloth (0.56 millimeter×0.68 millimeter). This can present a problem.

Environmental contaminants such as yeast spores have a nominal diameter of 3 to 4 microns (i.e., 0.000003 meters to 0.000004 meters) which is more than a factor of 100 smaller than the smallest opening in Grade 90 cheesecloth (0.00056 meters×0.00068 meters). Thus, yeast spores can fall through cheesecloth into the fermenting tea and contaminate the fermenting kombucha. This can present a problem.

Environmental contaminants such as pollen have a nominal diameter of 6 microns (i.e., 0.000006 meters) which is also a factor of 100 smaller than the smallest opening in Grade 90 cheesecloth (0.00056 meters×0.00068 meters). Thus, pollen can fall through cheesecloth into the fermenting tea and contaminate the fermenting kombucha. This can present a problem.

Environmental contaminants such as fungal spores and mold spores have a nominal diameter ranging from 1 to 40 microns (i.e., 0.000001 meter to 0.000040 meter) which is approximately between 500 to 14 times smaller than the smallest opening in Grade 90 cheesecloth (0.00056 meters× 0.00068 meters). Thus, fungal spores and mold spores can fall through cheesecloth into the fermenting tea and contaminate the fermenting kombucha. This can present a problem. Cotton muslin is also ineffective at filtering out pollen, yeast spores, fungal spores, and mold spores because of its large mesh size relative to these contaminants as noted in the discussion above. This can present a problem.

Even when cheesecloth or cotton muslin are used as a permeable layer for a top of a container in which kombucha is fermenting, the current methods for securing the cover to the container create spaces through which insects such as fruit flies can crawl and enter the container. This can present a problem.

Thus, current methods of fermenting kombucha present technical problems for which technical solutions using technical means are needed.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 5A illustrates a fermentation filter, according to embodiments of the invention.

FIG. 6A illustrates a fermentation filter incorporated into a lid in top view, according to embodiments of the invention.

DETAILED DESCRIPTION

Figure 1A:
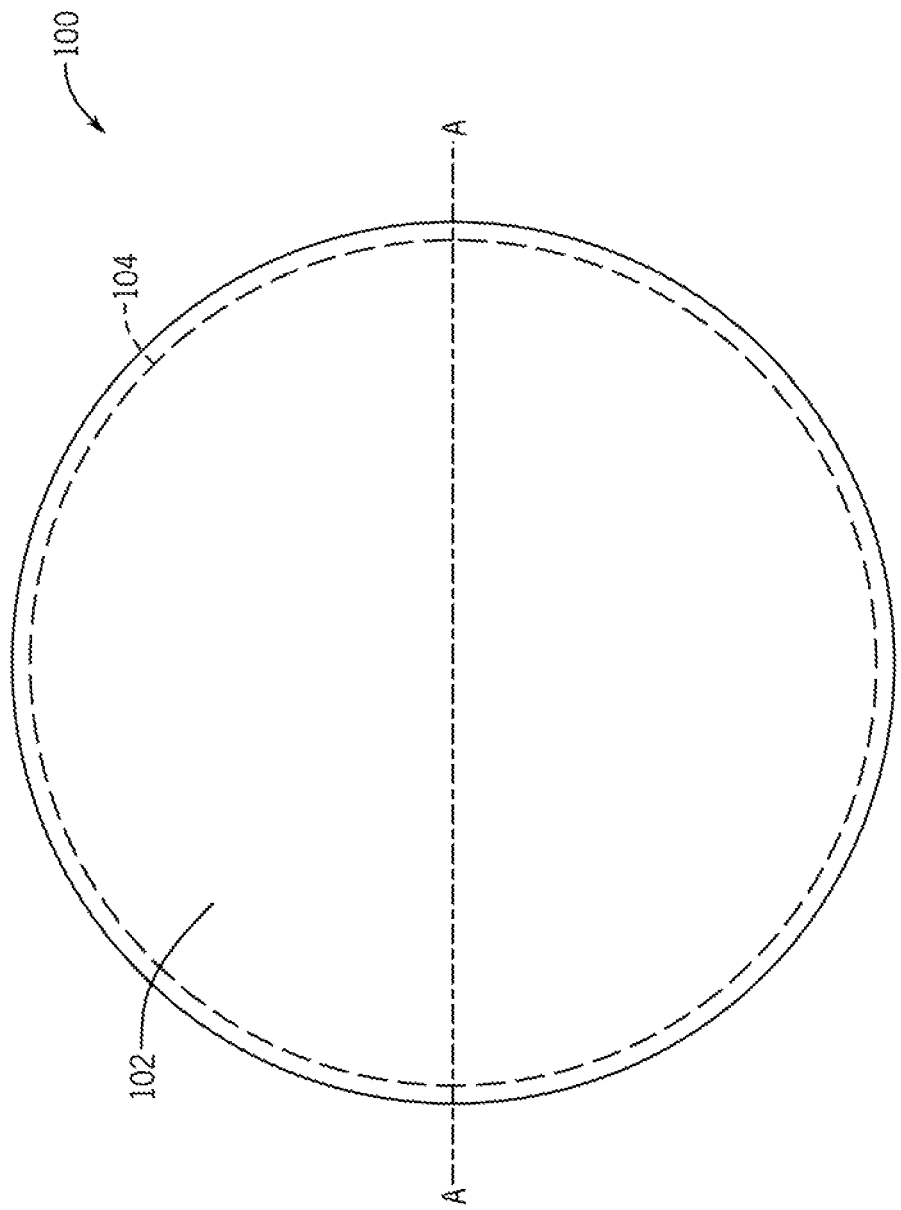
FIG. 1A illustrates a top view of a filter assembly, according to embodiments of the invention.

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known structures and techniques have not been shown in detail in order not to obscure the understanding of this description. The following detailed description is, therefore, not to be taken in a limiting sense, and the scope of the invention is defined only by the appended claims.

Apparatuses, systems, and methods are described for fermenting kombucha that keep environmental contaminants such as; insects (such as, but not limited to, fruit flies as well as other insects), insect eggs (such as, but not limited to, fruit fly eggs as well as other insect eggs), pollen, yeast spores, fungal spores mold spores, dust, etc. out of the fermenting container while providing air flow into the fermenting container to facilitate aerobic fermentation during the manufacture of kombucha.

It has been discovered that successful fermentation of kombucha is achieved using a filter material secured over an opening of a container that has a pore size that is much smaller than the pore sizes of cheesecloth and cotton muslin currently used by the kombucha manufacturing industry. Aerobic fermentation of the tea is successfully accomplished using a filter that has pore sizes in the 1 micron (0.000001 meter) to submicron range. Some examples of filter materials are, but are not limited to, polyester felt, polyester, expanded or alternatively "stretched" PTFE (Polytetrafluoroethylene), a composite of expanded PTFE and polyester felt, etc. Thus, embodiments of the invention are accomplished with a variety of filter materials and the specific types of filter material presented herein are illustrative and are not limiting.

The pore size of filter materials can be varied according to the design parameters of a filter system for a particular kombucha manufacture. For example, in some embodiments it is desirable to utilize a filter with a pore size in the range of 25 micron to 500 microns depending on the considerations of the environment in which the kombucha manufacture will take place. In some embodiments it is desirable to utilize a filter with a pore size in the range of 1 micron to 25 micron. In other embodiments it is desirable to make a pore size of a filter approximately equal to 1 micron. In yet other embodiments it is desirable to make a pore size of a filter less than 1 micron; for example, one or more tenths of a micron. Those of skill in the art will appreciate that the term "micron" is synonymous with the term "micrometer" and that one micrometer is one times ten to the minus six meters expressed numerically as: 1 micrometer=$1 \times 10^{-6}$ meter.

In some embodiments it is desirable to make a nanoporous PTFE membrane for use as the filter. In such embodiments, the pore size is less than 100 nanometers. Those of skill in the art will appreciate that one nanometer is one times ten to the minus nine meters expressed numerically as: 1 nanometer=$1 \times 10^{-9}$ meter.

Air molecules are on the order 200 to 300 picometers. Specifically, the constituent components of air molecules Oxygen, Nitrogen, and Carbon Dioxide have diameters that are 292, 300, and 232 picometers, respectively. Those of skill in the art will appreciate that a picometer is one times ten to the minus twelve meters expressed numerically as: 1 picometer=$1 \times 10^{-12}$ meter. Thus, the molecular diameter of a gas used during kombucha fermentation (air) can pass through a filter that is permeable to air. It has been discovered that adequate air flow for fermentation occurs through a permeable filter having a pore size of 1 micron or less.

Figure 1B:
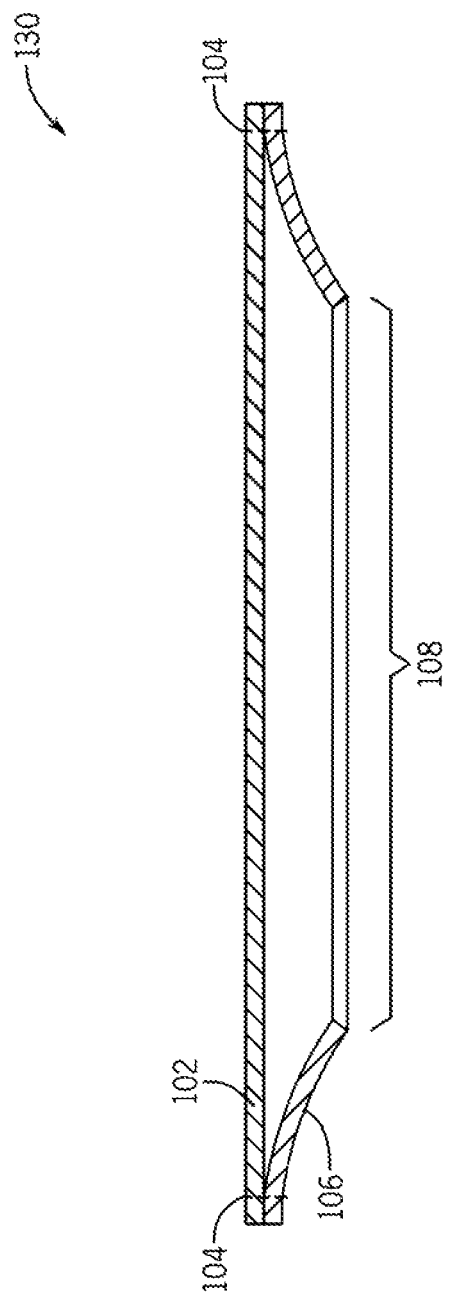
FIG. 1B illustrates a side view corresponding to FIG. 1A, according to embodiments of the invention.
Figure 1C:
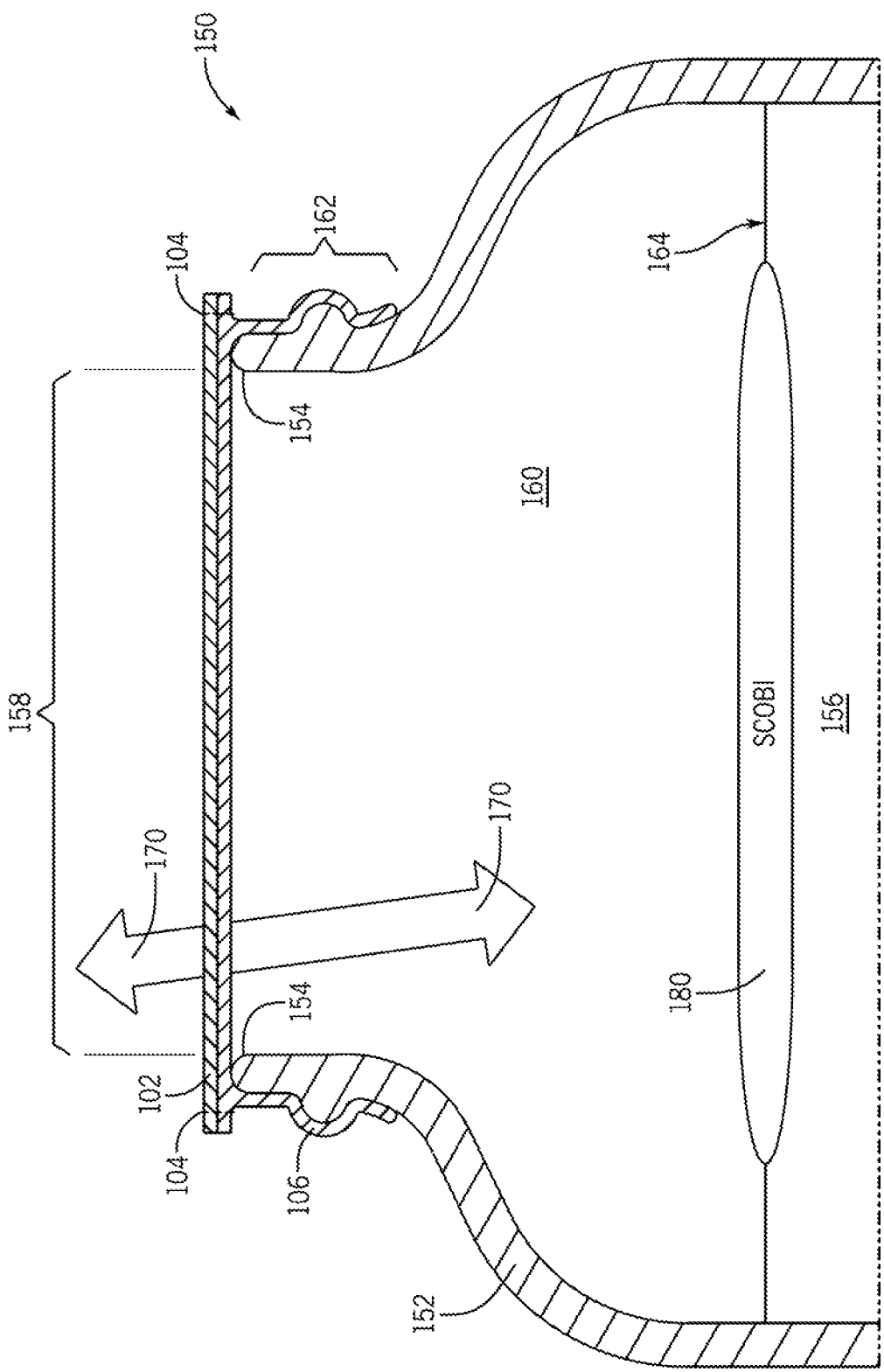
FIG. 1C illustrates a cross-sectional view of the filter assembly from FIG. 1A and FIG. 1B installed on a container, according to embodiments of the invention.

FIG. 1A illustrates, generally at 100, a top view of a filter assembly, according to embodiments of the invention. FIG. 1B illustrates, generally at 130, a side view corresponding to FIG. 1A, according to embodiments of the invention. FIG. 1C illustrates, generally at 150, a cross-sectional view of the filter assembly from FIG. 1A and FIG. 1B installed on a container, according to embodiments of the invention. With reference to FIG. 1A through FIG. 1C collectively, the filter assembly 100 is referred to herein in various embodiments, as a "bonnet," or a "kombucha bonnet," or equivalently as a "filter," or a "filter assembly." These terms will be used synonymously throughout this description of embodiments. A filter 102 is illustrated with a circular shape. The circular shape is used for illustration only and does not limit embodiments of the invention. Accordingly, a filter can have any shape such as a square shape, a rectangular shape, a multi-sided shape with more than four sides or less than four sides, or a baroque curved shape.

The filter 102 is coupled to an elastic member 106 (shown generally at 130 in Section A-A in FIG. 1B) by stitching 104. Stitching 104 illustrates sewing the filter 102 to the elastic member 106. The filter 102 and the elastic member 106 can be coupled together in other ways such as, but not limited to; by bonding, clamping, stapling, welding, gluing, taping, etc. The elastic member 106 has an opening 108. The opening 108 is configured to receive a lip of a container. The elastic member 106 can be made from a variety of materials that are flexible and provide elongation sufficient to stretch the elastic member 106 over a lip of a container. Some examples of materials are, but are not limited to; neoprene, urethane, polyurethane coated spandex, etc. An elastic member can be made from an elastomer. As used in this description of embodiments, an elastomer is a polymer generally with a low Young's modulus and high failure strain which makes the material capable of withstanding the large deformations that occur when the elastic member is installed over a lip of a container. Embodiments of the invention are not limited by the elastic material used for the elastic member, the specific examples of materials recited herein are illustrative and are not limiting.

With reference to FIG. 1C, a container 152 has a lip 154. The lip 154 defines an opening 158. The container 152 holds a quantity of liquid indicated at 156, with free surface of the liquid 156 indicated by a symbol ▼ identified by numeral 164. A SCOBY (symbiotic colony of bacteria and yeast) is indicated at 180. The filter 102 is held fast over the opening 158 by the elastic member 106. To mount the elastic member 106 on the lip 154, the elastic member 106 is stretched over the lip 154, thereby making a firm seal against the lip 154 along a length of the container indicated at 162. The seal made between the elastic member 106 and the container along the length 162 is free of spaces. This is a tight seal where the elastic member 106 exerts a force perpendicular to an outer surface of the container over a contact area, thereby eliminating spaces which prevents ingress from insects or airborne contaminates.

With the bonnet attached to the container 152, a region 160 within the container 152 can receive a free flow of gas from outside the container 152. The SCOBY 180 in the liquid 156 is in communication with a gas 170 above the free surface ▼ 164. The filter 102 is permeable to a gas such as air. Thus, a gas such as air can flow into the container 152 through the filter 102 and gas given off during fermentation can flow out of the container 152 through the filter 102. Flow of gas both into and out of the container 152 is indicated by the arrows 170.

Figure 2:
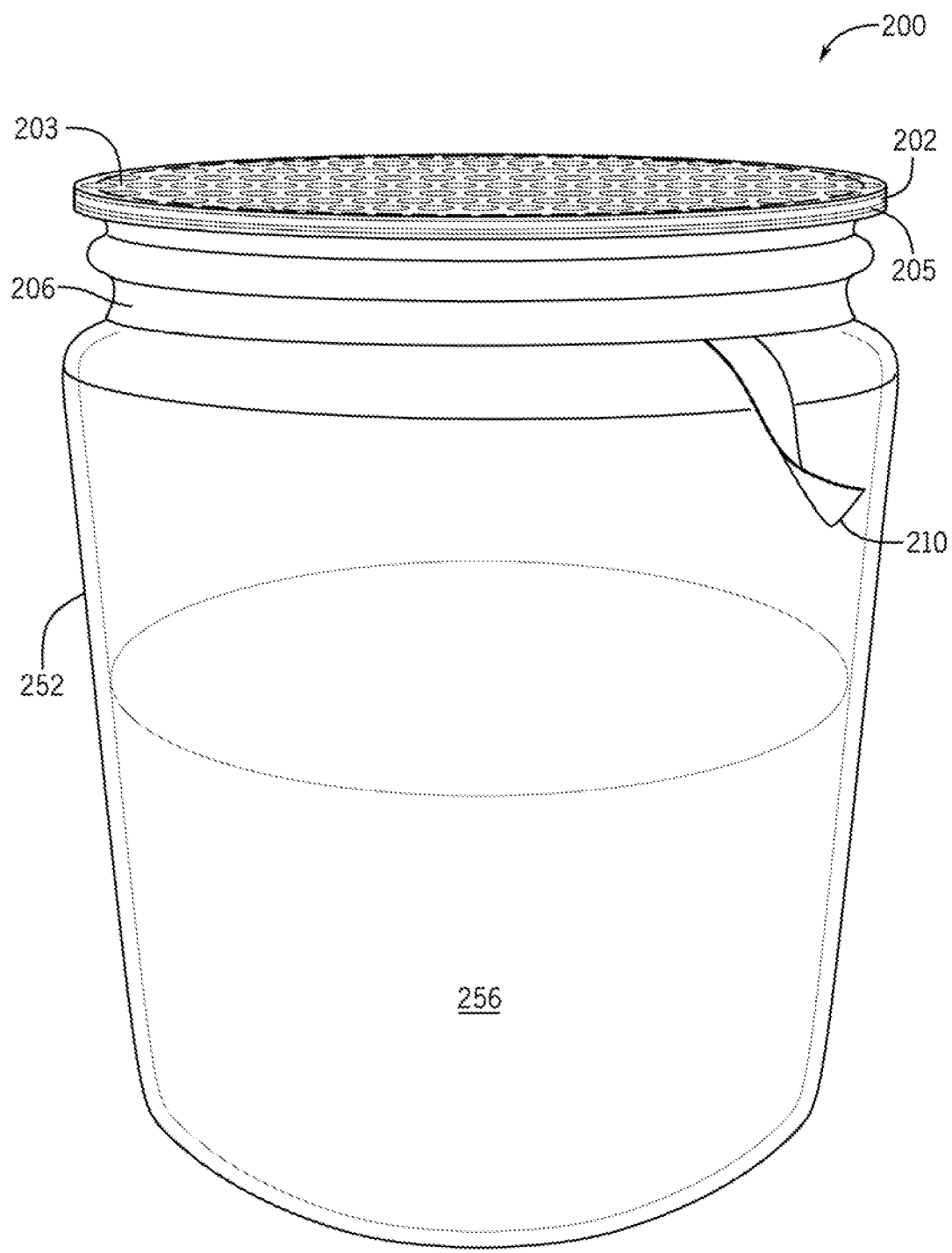
FIG. 2 illustrates a fermentation filter attached to a container, according to embodiments of the invention.

FIG. 2 illustrates, generally at 200, a fermentation filter attached to a container, according to embodiments of the invention. With reference to FIG. 2, a container 252 holds an amount of liquid 256 that is undergoing the process of fermentation into kombucha. A filter 202 is coupled to an elastic member 206 by sewing, bonding, clamping or other methods as described in conjunction with the figures above. The filter or bonnet is installed onto the opening of the container 252 as described in conjunction with the figures above. During installation, the elastic member 206 is stretched over the opening of the container 252. In some embodiments, a tab 210 extends from the elastic member 206 and is grasped by the user in order to pull and stretch the elastic member 206 over the opening of the container during installation, thereby accomplishing a snug fit. In some embodiments, more than one tab is provided to facilitate installing the elastic member over the lip of a container. The fit is sufficient to eliminate spaces between the elastic member of the container. Elimination of spaces prevents ingress from insects or deposition of other contaminants such as spores of mold, yeast, pollen, dust, etc. which exist in the environment.

In some embodiments, it is beneficial to protect the surfaces of the filter 202 with one or more layers of protective material such as those illustrated at 203 and 205. Protective layers 203 and 205 contain large openings that permit easy cleaning of large debris that might fall thereon and also protect the surfaces of the filter when the bonnet is being washed either by hand or in a washing machine. Some filter materials such as polyester felt will experience pilling after repeated machine washing. Protective layers 203 and 205 reduce pilling and prolong the appearance and the life of the filter 202. Protective layers 203 and 205 can be made from a plastic such as nylon, polyethylene, etc.

Figure 3A:
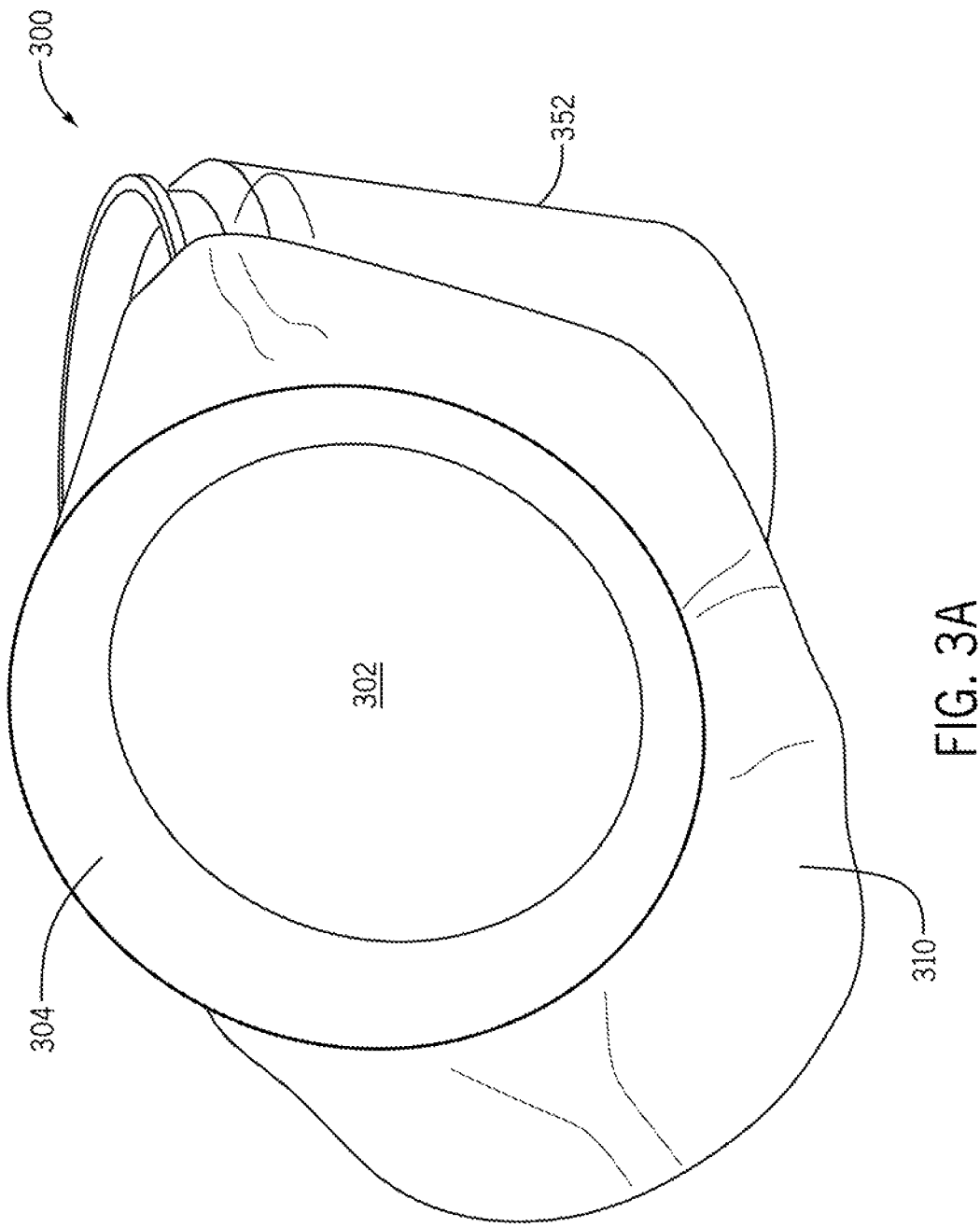
FIG. 3A illustrates a bottom view of a fermentation filter with a cover, according to embodiments of the invention.

FIG. 3A illustrates, generally at 300, a bottom view of a fermentation filter with a cover, according to embodiments of the invention. With reference to FIG. 3A, a container 352 holds a quantity of liquid for fermentation during kombucha manufacture. An underside of a bonnet is illustrated in FIG. 3A. A filter 302 is couple to an elastic member 304. A bottom side of a cover 310 is attached to the filter 302. The view shown in FIG. 3A is before the bonnet has been installed onto the container 352.

Figure 3B:
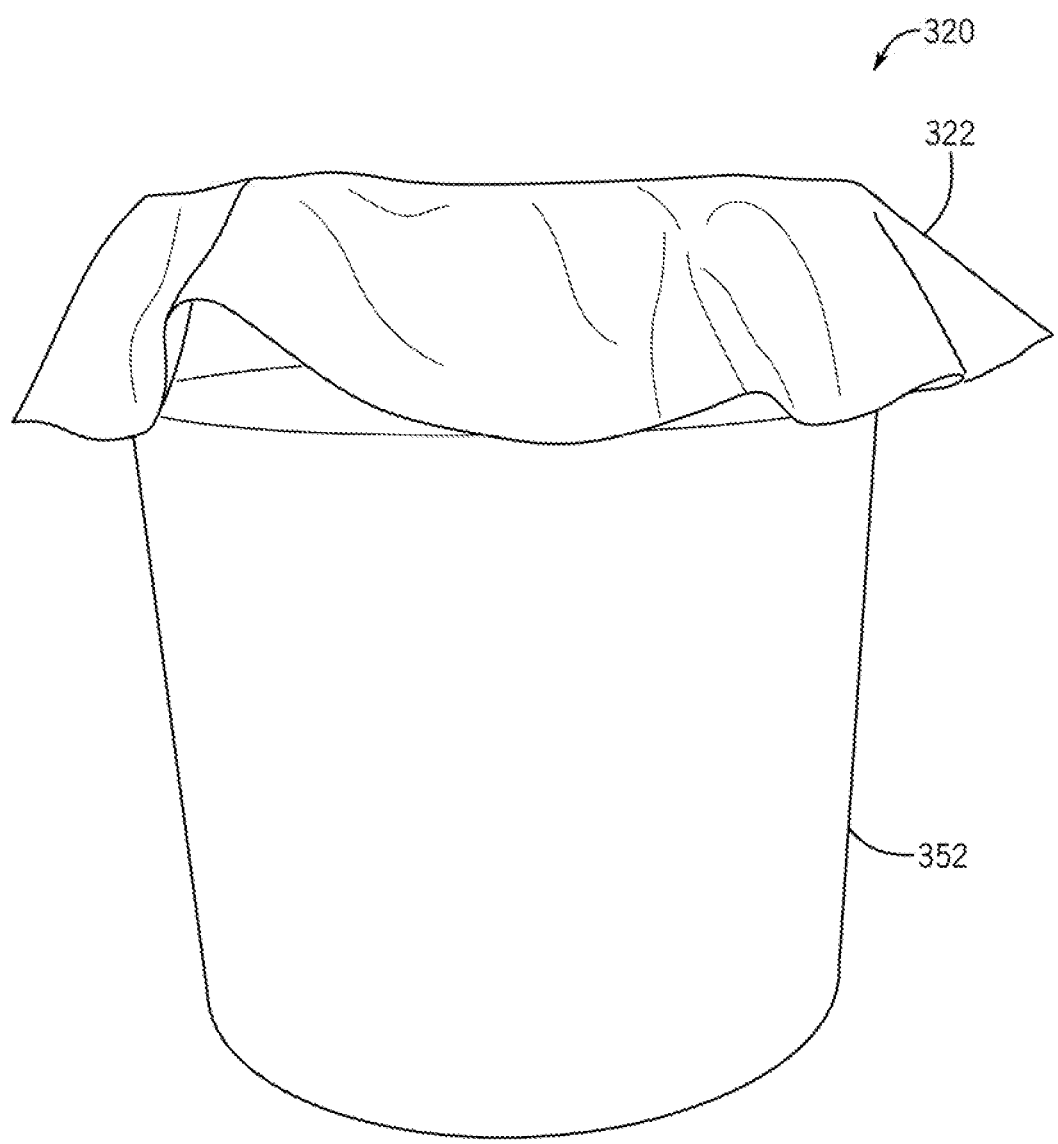
FIG. 3B illustrates the fermentation filter from FIG. 3A attached to a container, according to embodiments of the invention.

FIG. 3B illustrates, generally at 320, the fermentation filter from FIG. 3A attached to a container, according to embodiments of the invention. With reference to FIG. 3B, the elastic member 304 has been stretched over an opening of the container 352. Visible now, is a top side 322 of the cover. The cover serves several functions. A first function keeps airborne particulate or environmental particulate from making direct contact with the filter that is located beneath the cover. Airborne particulate can arise from various sources such as airflow induced in a building from heating, ventilating, and cooling (HVAC) systems, opening and closing of doors or windows, walking by a fermentation container, thermal currents, wind in outdoor environments, etc. Airborne particulate can be removed from the upper surface of the cover before the particulate reaches a filter. A second function that a cover can serve is to provide a surface for information. Some examples of information are, but are not limited to: container identification, kombucha batch information, etc. Some examples of kombucha batch information are, but are not limited to; start date of fermentation, end date for fermentation, SCOBY info, quantity of sugar added, target fermentation temperature, etc. A third function served by the cover is that of decoration. A cover can be made out of an attractive material thereby turning a kombucha brewing container into an attractive item.

Figure 3C:
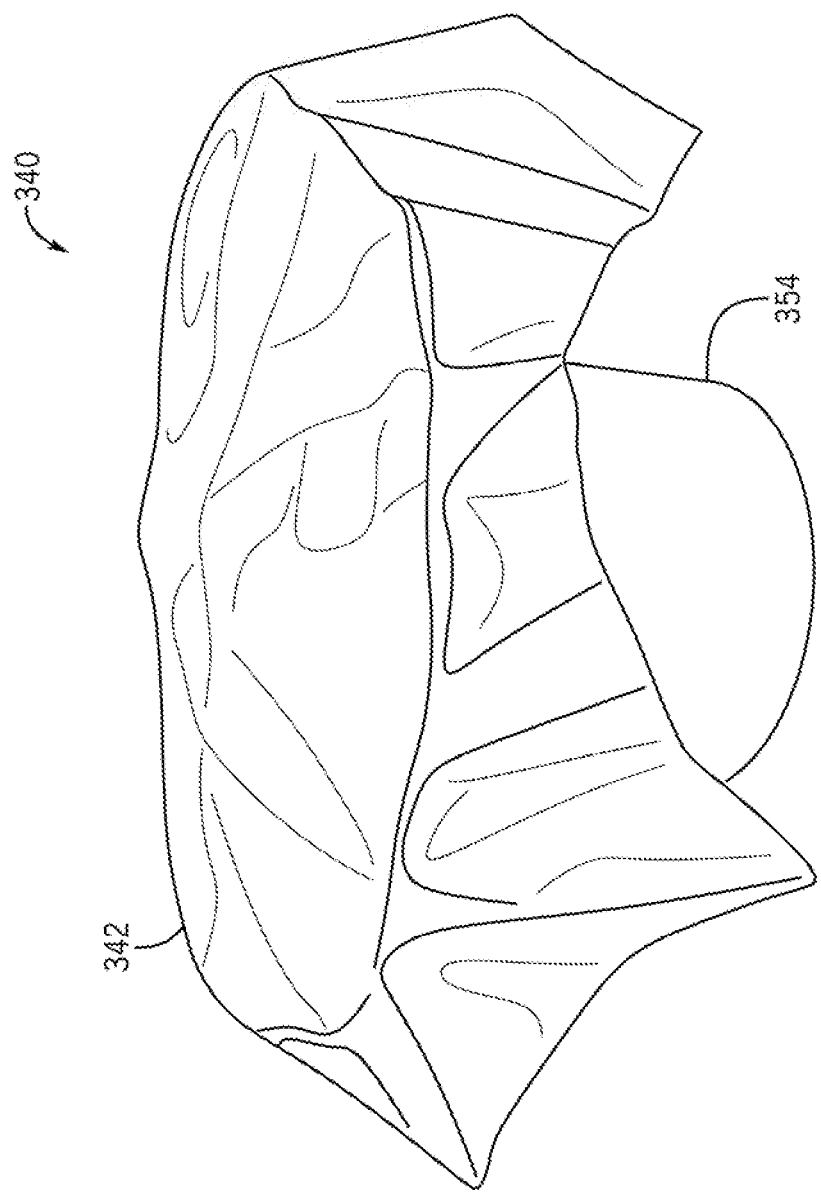
FIG. 3C illustrates a decorative cover, according to embodiments of the invention.

FIG. 3C illustrates, generally at 340, a decorative cover, according to embodiments of the invention. With reference to FIG. 3C, a container 354 has a bonnet attached thereto utilizing an elastic member stretched over an opening of the container 354 as previously described. Visible in FIG. 3C is a decorative cover 342. The decorative cover 342 is attached to the filter (not visible) that is located beneath the decorative cover 342. Decorative covers can also provide information as described above. Also as described above, decorative covers can provide the function of keeping airborne particulate or environmental particulate from making direct contact with the filter that is located beneath the decorative cover.

Figure 3D:
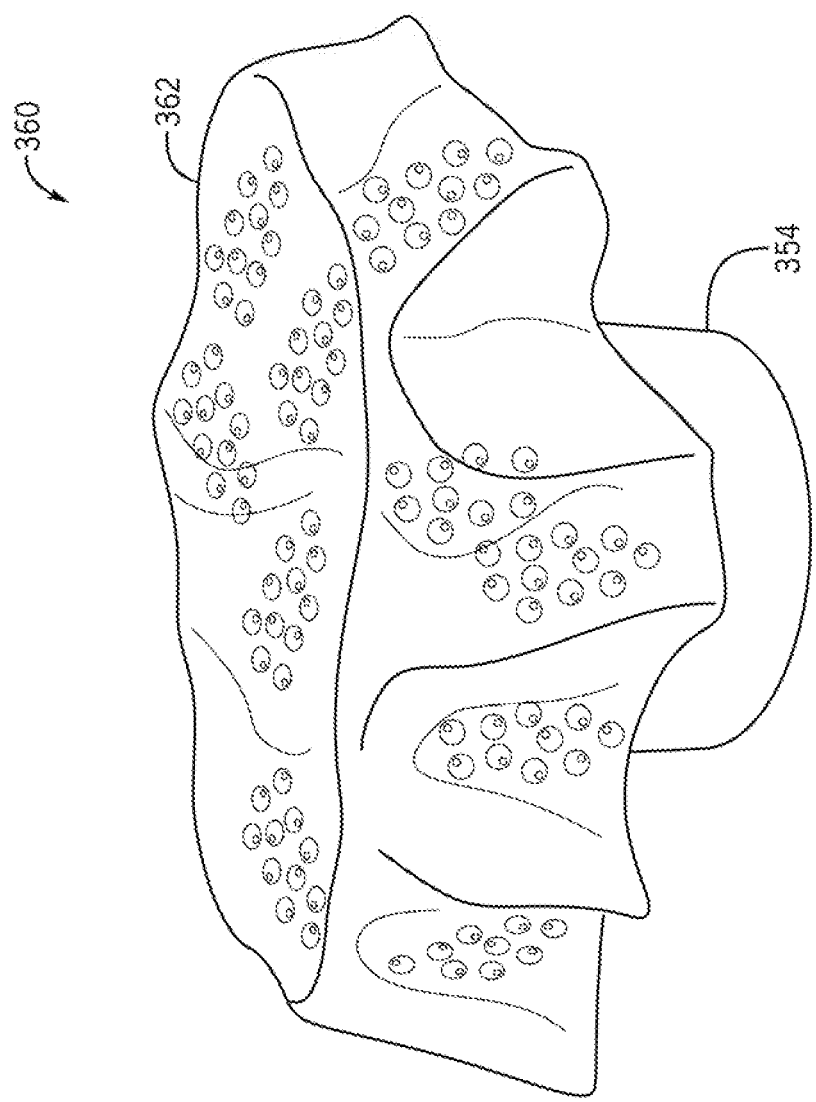
FIG. 3D illustrates another decorative cover, according to embodiments of the invention.

FIG. 3D illustrates, generally at 360, another decorative cover, according to embodiments of the invention. With reference to FIG. 3D, a decorative cover 362 is illustrated on the container 354. The decorative cover 362 contains design elements attached to a sheet of material. Thus, many variations of covers are used with a filter according to various embodiments of the invention.

Figure 4A:
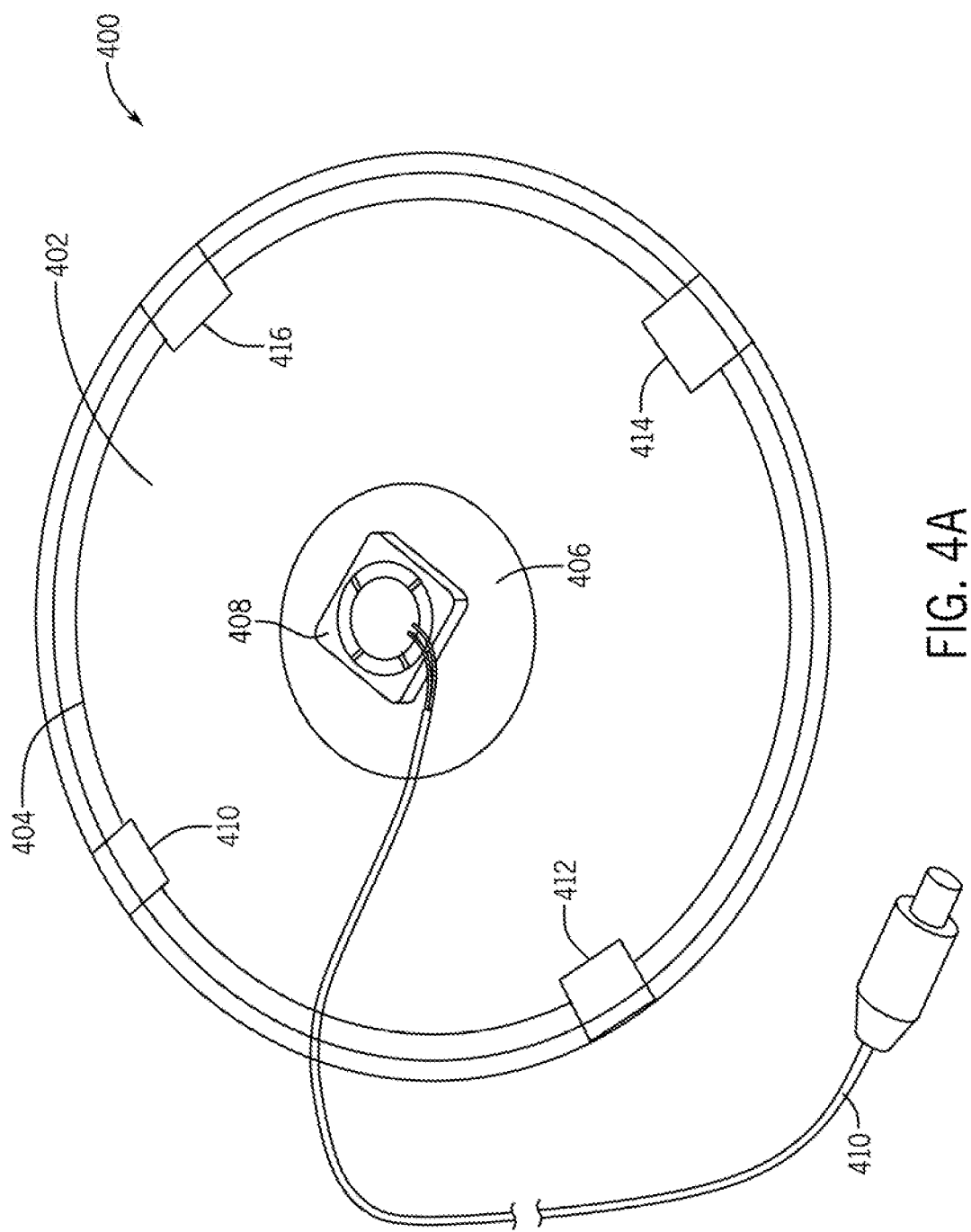
FIG. 4A illustrates a pocket attached to a filter, according to embodiments of the invention.

FIG. 4A illustrates, generally at 400, a pocket attached to a filter, according to embodiments of the invention. With reference to FIG. 4A, a filter is shown at 402. The filter is coupled to an elastic member (not shown) located beneath the filter 402. In this embodiment, the elastic member is sewn to the filter 402 as indicated by the stitching shown at 404. A pocket 406 is formed out of a material and is attached to the filter 402. The pocket can be made out of the same material as the elastic member or the pocket can be made out of a different material. The pocket 406 is bonded to an upper side of the filter 402. In some embodiments, the pocket is used to house a fan 408. The pocket 406 has an opening into which the fan 408 is inserted. In such a case, the pocket 406 is made from an elastic material that stretches in order to permit the fan to be inserted therein. The fan 408 has a power cord 410. The power cord 410 is used to supply a source of electrical power to the fan 408. Also shown on the upper surface of the bonnet 402 are several attachment points 410, 412, 414, and 416. Attachment points 410 through 416 are used to releasably couple a cover or decorative cover to the filter 402. In various embodiments, the attachment points 410 through 416 are realized by using hook and loop material, snaps, buttons, etc. The example shown in FIG. 4A/FIG. 4B uses hook and loop material.

Figure 4B:
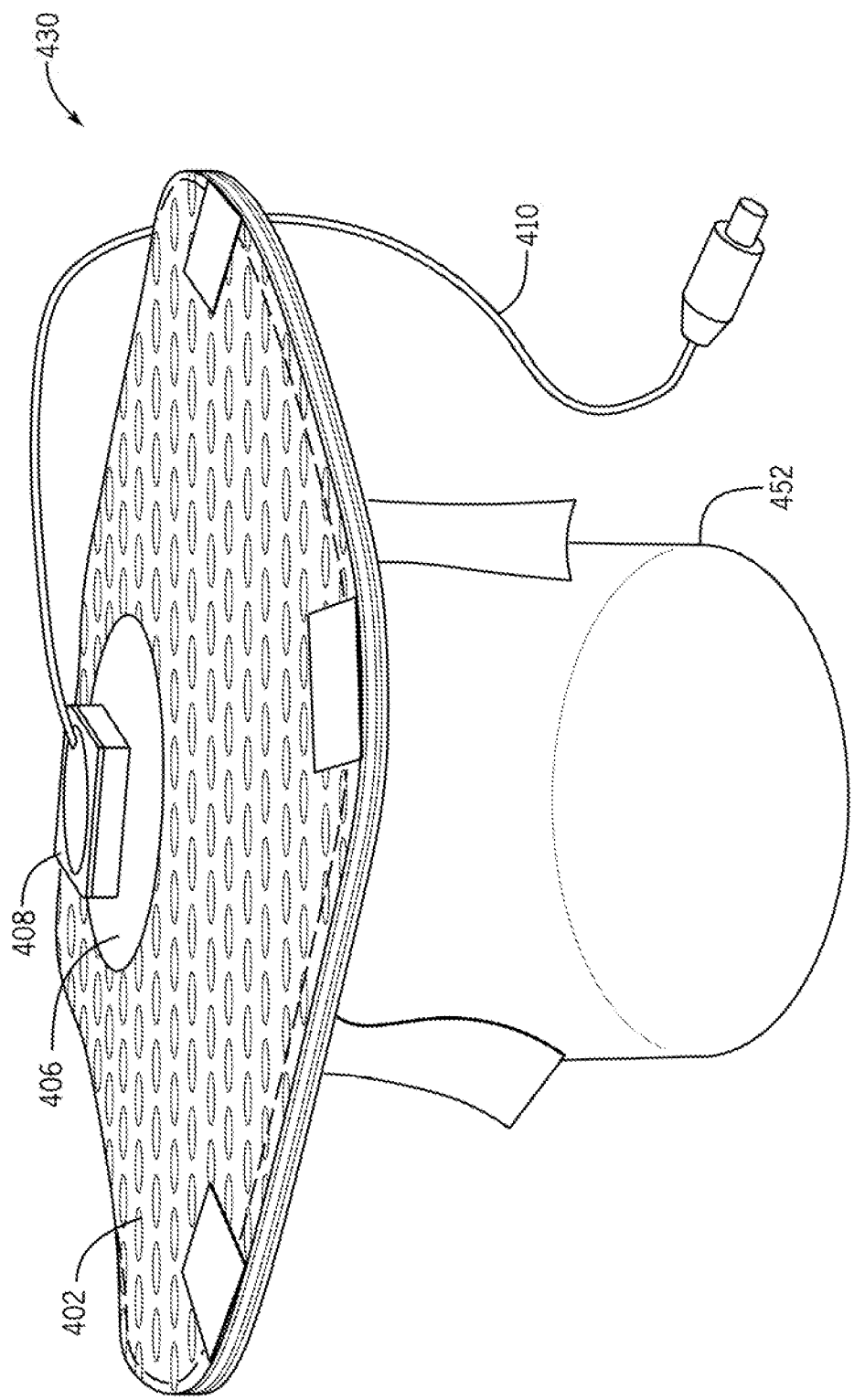
FIG. 4B illustrates a fan used in conjunction with a fermentation filter, according to embodiments of the invention.

FIG. 4B illustrates, generally at 430, a fan used in conjunction with a fermentation filter, according to embodiments of the invention. With reference to FIG. 4B, the filter 402 is installed on the container 452. The fan 408 is installed in the pocket 406. In operation, the fan 408 draws air from beneath its housing, lowering the pressure locally, thereby causing air to flow out of the container which the fan then exhausts to the room. Makeup air from the room is drawn into the container over the portion of the filter that is not covered by the pocket. Thus, a flow of a gas, such as air, in and out of the container can be accomplished through the use of a fan incorporated with the filter 402.

The filter 402, illustrated in FIG. 4A/FIG. 4B, is sandwiched between protective layers that are described above.

FIG. 5A illustrates, generally at 500, a fermentation filter, according to embodiments of the invention. With reference to FIG. 5A, a container 504 is used to hold a volume of liquid during kombucha manufacture. The container 504 has a lip 506. The lip 506 defines an opening 508. A filter 502 is configured to cover the opening 508 and to extend down over the opening 508.

Figure 5B:
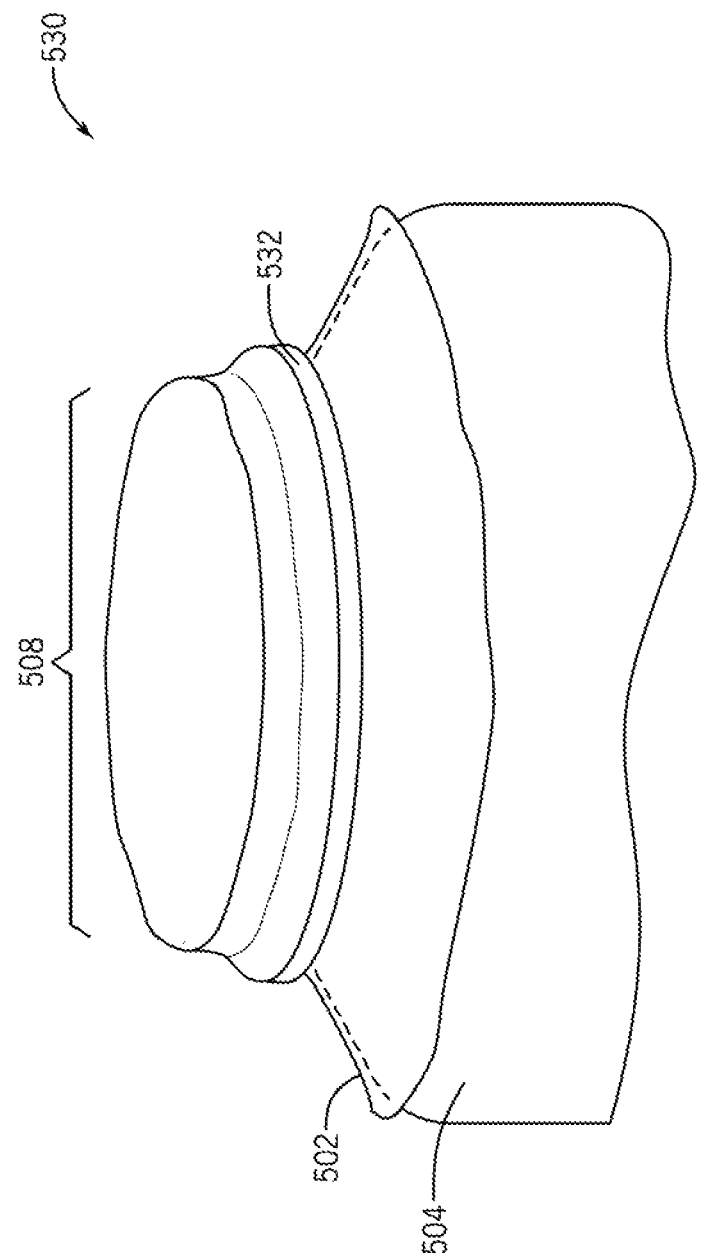
FIG. 5B illustrates the fermentation filter of FIG. 5A secured to a container, according to embodiments of the invention.

FIG. 5B illustrates, generally at 530, the fermentation filter of FIG. 5A secured to a container, according to embodiments of the invention. With reference to FIG. 5B, the filter 502 has been drawn over the opening 508 and secured to the container using an elastic seal 532. In various embodiments, the elastic seal is a cord, a lace, a rubber band, or a bungee cord, etc. When a cord or a lace is used for the elastic seal, the cord or lace can have two free ends that require securing or cinching together. Securing or cinching can be done in various ways, such as but not limited to; tying a knot, utilizing a buckle, etc. In various embodiments, an elastic seal can be made with mechanical properties similar to those described above in conjunction with the elastic member(s) of the preceding figures. In some embodiments, a Young's Modulus of a material used for the elastic seal is larger than the Young's Modulus for a material described above in conjunction with FIG. 1A through FIG. 1C for the elastic member 106.

In some embodiments, an optional gasket 512 is used between the container 504 and the filter 502. The gasket 512 is made from a deformable material such as a closed-cell foam. When the elastic seal 532 is drawn tight, capturing and applying pressure to the filter 502, the gasket 512 deforms thereby causing any spaces between the filter 502 and the gasket 512 to close. In some embodiments, a gasket 512 is not needed, and the elastic seal 532 can be tightened to sufficiently compress the filter 502 against the container 504 thereby eliminating any spaces between the filter 502 and the container 504. A filter material such as polyester felt has a thickness and a compressibility that can permit its use without a gasket to eliminate spaces, thereby sealing the container to a pore size limited by the pore size of the filter. With the elastic seal cinched snugly as described herein the filter and the gasket provide a barrier to the ingress of insects and particulate from the environment. Thus, contaminants are kept out of the liquid contained within the container 504.

FIG. 6A illustrates, generally at 600, a fermentation filter incorporated into a lid in top view, according to embodiments of the invention. With reference to FIG. 6A, a container 610 has a lid 602. The lid 602 is coupled to the container 610 using devices 606 and 608 to provide a lid that is releasably sealable to the container 610. In various embodiments, devices 606 and 608 are latches, or a hinge and a latch, etc. The lid 602 has a filter 604 extending over a portion of an area of the lid 602.

Figure 6B:
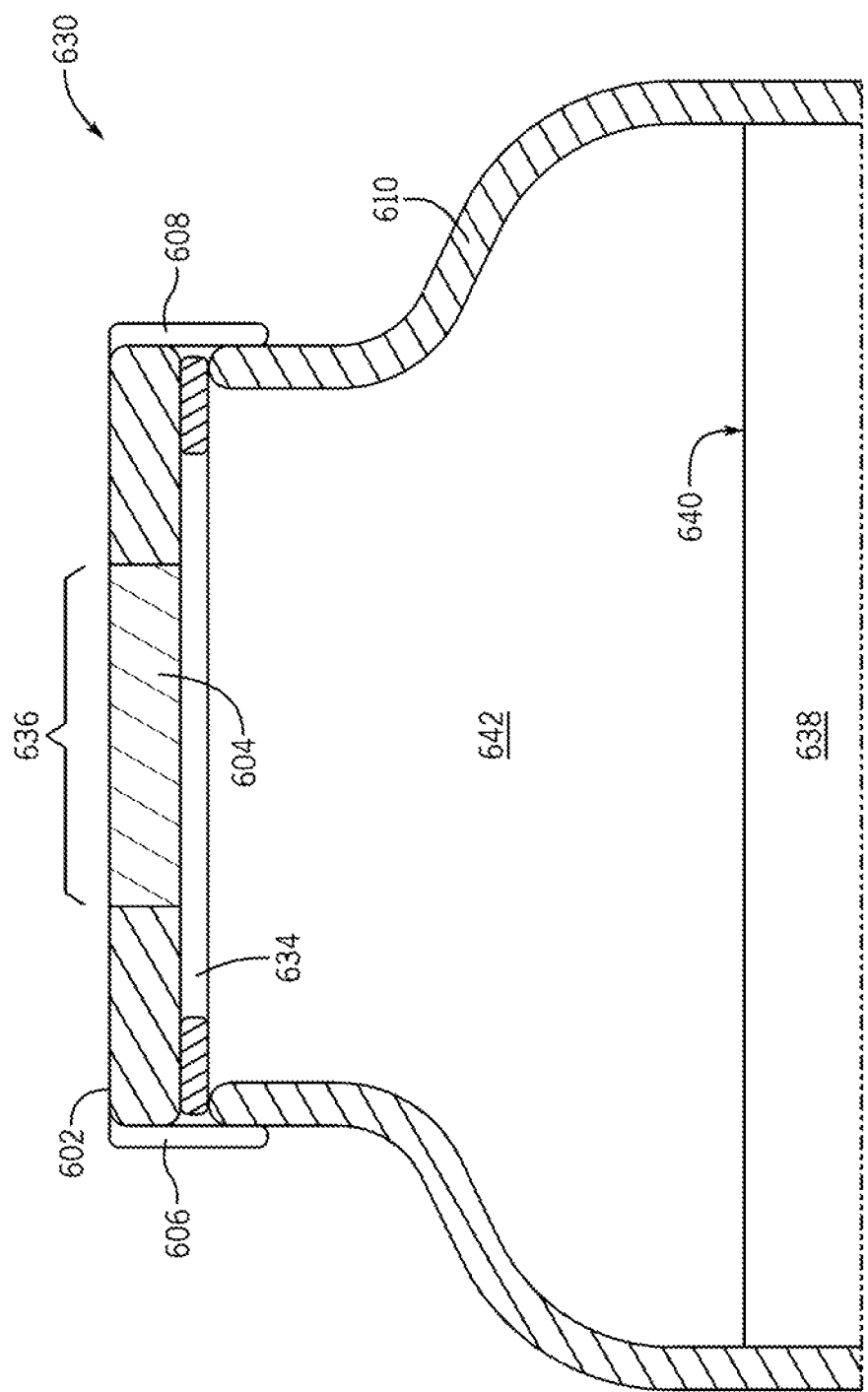
FIG. 6B illustrates the fermentation filter of FIG. 6A in side view, according to embodiments of the invention.

FIG. 6B illustrates, generally at 630, the fermentation filter of FIG. 6A in side view, according to embodiments of the invention. With reference to FIG. 6B, an annular seal 634 exists between a lip of the container 610 and the lid 602. The seal 634 eliminates spaces between the lid 602 and the container 610, thereby eliminating spaces through which insects or particulate can enter and contaminate a liquid 638. The container 610 holds the liquid 638, which is a tea that is fermented during the manufacture of kombucha. The liquid 610 has a free surface indicated at 640, avoid above the free surface is indicated at 642.

The filter 604 is incorporated into the lid 602 to provide a structure that is limited by the pore size of the filter with respect to ingress of potential contaminants. In other words, the filter 604 and the lid 602 fit tightly together such that spaces are eliminated between the mating surfaces. The filter has a width indicated at 636 that defines an area over which a gas, such as air, can pass into and out of an upper portion 642 of the container 610. The filter 604 has a pore size that is sufficiently small to prevent contaminates such insects, insect eggs, pollen, mold spores, etc., as described above, from entering and contaminating the liquid 638 during the manufacture of kombucha. In some embodiments, the filter 604 is bonded into the lid 602. In other embodiments, the filter 604 is attached to a mechanical structure such as a frame and then the frame is attached to the lid. The frame can be removably attached to the lid 602 to facilitate removal and replacement of the filter. In addition, a filter attached via a removable mechanism enables filters of different pore size to be used with a single lid 602. In some embodiments, a lid is used with a given container. In such a case where the lid 602 is not removable from the container 610, a removable filter provides longevity to the container and increases the functionality by permitting filters of different pore size to be used with the given container and lid combination.

Figure 6C:
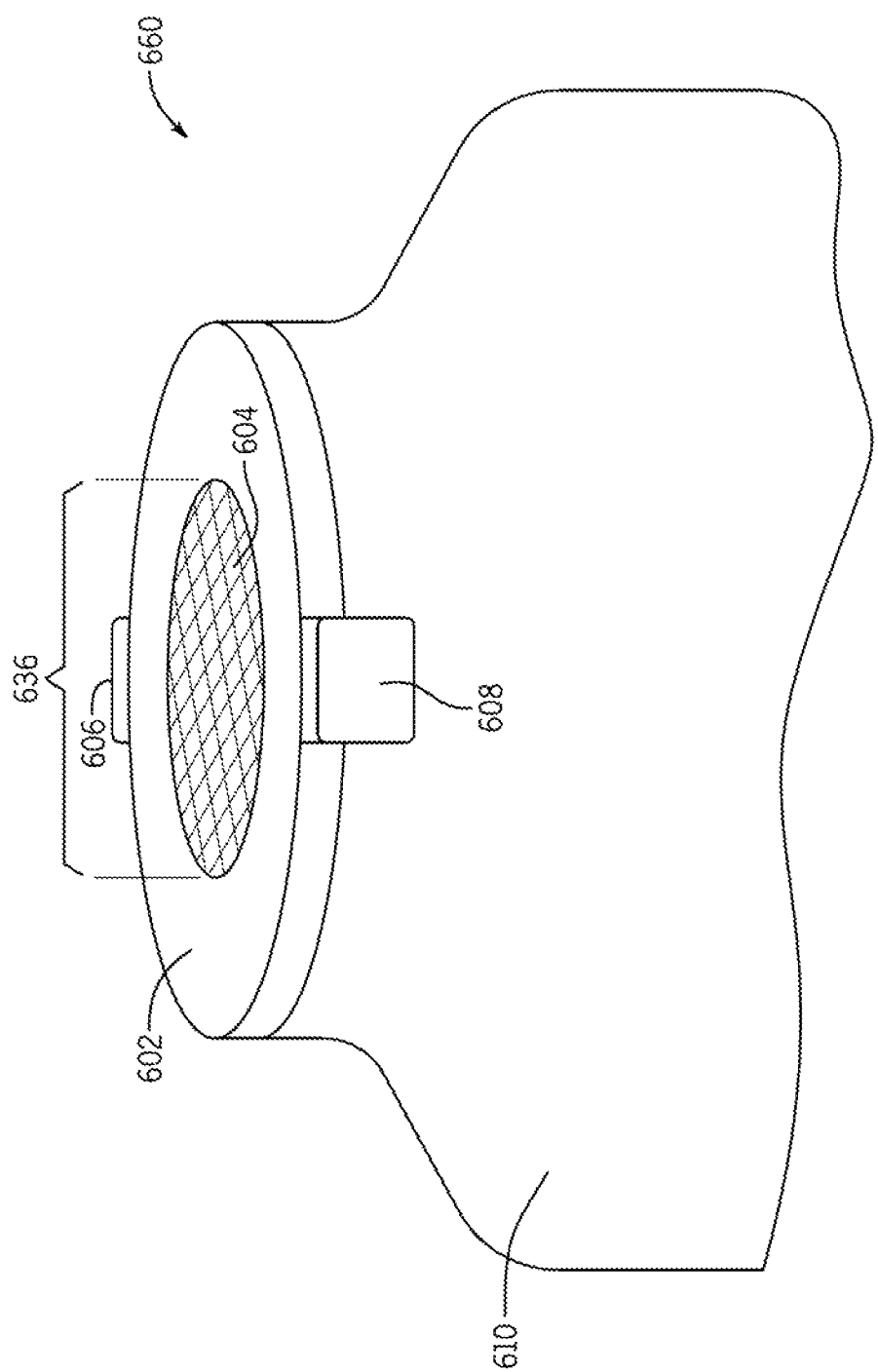
FIG. 6C illustrates the fermentation filter from FIG. 6A and FIG. 6B in perspective view, according to embodiments of the invention.

FIG. 6C illustrates, generally at 660, the fermentation filter from FIG. 6A and FIG. 6B in perspective view, according to embodiments of the invention. Though not shown in FIG. 6A through FIG. 6C, a fan can be incorporated therein as described above in conjunction with the previous figures.

In some embodiments, the seal 634 is either replaced by, or used in conjunction with, a filter that covers an opening of the container 610. In some embodiments, the lid 602 captures the filter between the lid 602 and a lip of the container 610, thereby sealing the container 610 to a pore size established by the pore size of the filter. In some embodiments, the lid 602 is made with a screw thread that extends down over the outside of the container 610 and an outer surface of the container 610 near the lip is made with a mating screw thread. The screw thread of the lip engages with the screw thread of the container 610 to hold the filter securely therebetween. Incorporating a screw thread as described above can replace the devices 606 and 608.

Figure 7:
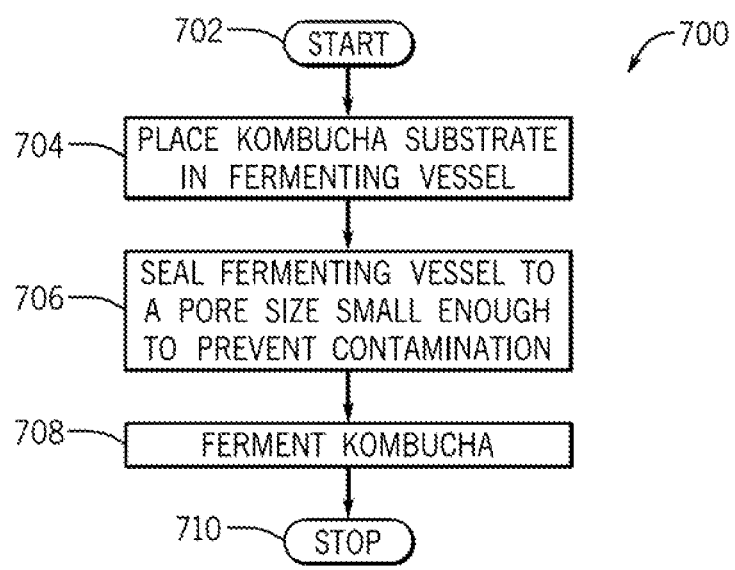
FIG. 7 illustrates a method for manufacturing kombucha, according to embodiments of the invention.

FIG. 7 illustrates, generally at 700, a method for manufacturing kombucha, according to embodiments of the invention. With reference to FIG. 7, a process commences at a block 702. At a block 704, the substrate needed to ferment kombucha is placed into a vessel (container). The substrate includes, but is not limited to, brewed tea, sugar, water, etc. At a block 706 the vessel is sealed to a pore size. The pore size is selected to prevent contamination. Sealing to a pore size is accomplished by using a filter in combination with a container to eliminate spaces through which insects and other airborne particulate can enter resulting in contamination of the substrate during kombucha manufacture.

At a block 708 the liquid ferments in the container until the process is stopped at a block 710. At a block 710 the container is opened, the SCOBY is removed, and the fermented tea is drawn off from the container.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring embodiments of the present invention. These embodiments are described in sufficient detail to enable those of ordinary skill in the art to practice the invention, and it is to be understood that other embodiments may be utilized and that logical, mechanical, and other changes may be made without departing from the scope of the present invention.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus, embodiments of the invention can be used in kombucha manufacturing to eliminate contamination of the fermenting tea.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus used to ferment a liquid during kombucha manufacture, comprising:
   a bonnet, the bonnet is configured to cover an opening of a container, the container defines a volume to hold the liquid, the container has a lip that defines the opening, the bonnet further comprising:
   a filter, the filter is permeable to a gas and has a pore size; and
   an elastic member, the elastic member is coupled to the filter, the elastic member is elastically engageable with the lip such that when the bonnet is attached to the container the bonnet covers the opening and the elastic member is removably sealable to the lip, when the bonnet is engaged with the lip a gas can pass through the filter and particles larger than the pore size are kept out of the liquid by the filter during fermentation of the liquid; and
   a pocket, the pocket is fixed to an outer surface of the filter, the pocket has a pocket opening, the pocket opening is sized to receive a fan, in operation when the fan is in an on state the fan draws a vacuum on the outer surface of the filter.

2. The apparatus of claim 1, wherein the pore size is less than 100 micrometers.

3. The apparatus of claim 1, wherein the pore size is less than or equal to 1 micrometer.

4. The apparatus of claim 1, wherein the pore size is less than 1 micrometer.

5. The apparatus of claim 1, when the elastic member is elastically engaged with the lip, the gas is restricted to flow only through the filter.

6. The apparatus of claim 1, further comprising:
   a fan, the fan is sized to fit into the pocket opening.

7. The apparatus of claim 1, further comprising:
   at least one attachment point, the at least one attachment point fastens a cover to the filter.

8. The apparatus of claim 7, wherein the cover is selected from the group consisting of a decorative cover and a cover that provides information on the liquid.

9. The apparatus of claim 1, further comprising:
   at least one attachment tab, the at least one attachment tab is coupled to the elastic member, the at least one attachment tab is sized to permit a user to grasp the at least one attachment tab during installation of the elastic member onto the lip.

10. The apparatus of claim 1, wherein the elastic member is made from a material selected from the group consisting of a polymer, a rubber, and an elastic structure.

11. The apparatus of claim 1, wherein the elastic member is made from Polyurethane coated Spandex.

12. The apparatus of claim 1, wherein the elastic member is made from Neoprene.

13. The apparatus of claim 1, wherein the elastic member is coupled to the filter by sewing.

14. The apparatus of claim 1, wherein the elastic member is coupled to the filter by bonding.

15. The apparatus of claim 1, wherein the filter is made from a material selected from the group consisting of polyester, polyester felt, and expanded PTFE.

16. The apparatus of claim 15, wherein the gas is air.

* * * * *